United States Patent
Maeno

(10) Patent No.: US 10,167,824 B2
(45) Date of Patent: Jan. 1, 2019

(54) AIR CLEANER OF ENGINE FOR PORTABLE WORKING MACHINE

(71) Applicant: Yamabiko Corporation, Tokyo (JP)

(72) Inventor: Takeshi Maeno, Tokyo (JP)

(73) Assignee: Yamabiko Corporation, Tokyo (JP)

(*) Notice: Subject to any disclaimer, the term of this patent is extended or adjusted under 35 U.S.C. 154(b) by 104 days.

(21) Appl. No.: 15/386,591

(22) Filed: Dec. 21, 2016

(65) Prior Publication Data

US 2017/0184063 A1  Jun. 29, 2017

(30) Foreign Application Priority Data

Dec. 25, 2015 (JP) ................. 2015-252957

(51) Int. Cl.
| | | |
|---|---|---|
| B01D 46/00 | (2006.01) | |
| F02B 63/02 | (2006.01) | |
| F02M 17/34 | (2006.01) | |
| F02M 35/024 | (2006.01) | |

(52) U.S. Cl.
CPC ... *F02M 35/02416* (2013.01); *B01D 46/0004* (2013.01); *B01D 46/0005* (2013.01); *B01D 46/008* (2013.01); *F02B 63/02* (2013.01); *F02M 17/34* (2013.01); *B01D 2265/027* (2013.01); *B01D 2265/029* (2013.01); *B01D 2279/60* (2013.01)

(58) Field of Classification Search
CPC ............ B01D 46/0004; B01D 46/0005; B01D 46/008; B01D 2265/027; B01D 2265/029; B01D 2279/60; F02M 17/34; F02M 35/02416; F02M 35/02433; F02B 63/02

See application file for complete search history.

(56) References Cited

U.S. PATENT DOCUMENTS

| | | | | |
|---|---|---|---|---|
| 3,881,250 A | * | 5/1975 | Frederickson | F02B 63/02 30/383 |
| 5,070,851 A | * | 12/1991 | Janisch | F02M 13/08 123/527 |
| 5,522,355 A | * | 6/1996 | Uhl | F02B 63/02 123/195 C |
| 5,632,243 A | * | 5/1997 | Buchholz | F02B 63/02 123/198 E |

(Continued)

FOREIGN PATENT DOCUMENTS

JP  H0972220 A  3/1997

*Primary Examiner* — Jason M Greene
(74) *Attorney, Agent, or Firm* — Withrow & Terranova, PLLC

(57) ABSTRACT

An air cleaner includes: a frame member equipped at an intake port of a carburetor and provided with an air inlet port; a filter held by a holding part included in the frame member; a lid member configured to cover a front face of the filter; and a screw with a knob, the screw being configured to connect the frame member and the lid member together. The frame member is provided with an insertion hole, where the screw with the knob is inserted, on the outer side of the holding part. The lid member includes a part to be connected, to which the screw with the knob is connected, the screw being inserted into the insertion hole from a side close to the carburetor. A knob part of the screw with the knob is disposed on the inner side of a circumscribed line between the lid member and the engine.

6 Claims, 5 Drawing Sheets

(56) References Cited

U.S. PATENT DOCUMENTS

| | | | | |
|---|---|---|---|---|
| 2002/0184863 A1* | 12/2002 | Bergami | ............ | B01D 46/0004 |
| | | | | 55/486 |
| 2004/0173178 A1* | 9/2004 | Hettmann | .......... | B01D 46/0004 |
| | | | | 123/198 E |
| 2008/0022641 A1* | 1/2008 | Engelland | .......... | B01D 46/0004 |
| | | | | 55/521 |
| 2013/0306018 A1* | 11/2013 | von Krane | ....... | F02M 35/02483 |
| | | | | 123/184.21 |
| 2014/0261255 A1* | 9/2014 | Ichihashi | .................. | F01P 1/02 |
| | | | | 123/41.34 |
| 2017/0128869 A1* | 5/2017 | Simmons | ........... | B01D 46/0005 |
| 2018/0080419 A1* | 3/2018 | Bringhurst | ......... | F02M 35/0216 |

* cited by examiner

ND GINE FOR PORTABLE
AIR CLEANER OF ENGINE FOR PORTABLE WORKING MACHINE

CROSS-REFERENCE TO RELATED APPLICATIONS

This application claims priority to Japanese Patent Application No. 2015-252957 filed on Dec. 25, 2015, the disclosure of which is hereby incorporated herein by reference in its entirety.

TECHNICAL FIELD

The present invention relates to an air cleaner of an engine for a portable working machine.

BACKGROUND

In an engine for a portable working machine such as a brush cutter, a chain saw, a hedge trimmer, and a blower, an air cleaner is detachably equipped on the outer side of an intake port of a carburetor to prevent dust etc. from entering the engine through the intake port of the carburetor (see Japanese Patent Application Publication No. H9-72220).

The air cleaner is typically provided with a lid member (an air cleaner lid) configured to cover a front face of the intake port of the carburetor to form an air inlet path toward the intake port of the carburetor, and has such a structure that a filter is disposed between the lid member and the intake port of the carburetor.

SUMMARY

In the air cleaner of the engine for the portable working machine, the filter tends to be clogged with dust in operation, and therefore, the filter needs to be relatively frequently replaced.

For this reason, the lid member of the air cleaner is, by screwing, detachably attached to a support of the intake port of the carburetor. In a typical technique, the lid member is fixed to the support with a bolt screw having a slotted head. However, the head of the bolt screw is sunk in a recessed part of the lid member, and therefore, a tool for rotating the bolt screw is required. For this reason, a fixing method requiring no tool has been demanded to facilitate an attachment/detachment process.

For this situation, use of a screw with a knob has been proposed. However, the knob protrudes to the outer side of the lid member of the air cleaner, and great external force is sometimes applied to a knob part of the protruding screw due to, e.g., engine dropping or impact in transportation. This leads to a problem that the air cleaner is easily damaged.

Moreover, the typical technique employs a fixing structure in which the screw penetrates through a center part of the lid member in the air cleaner. Thus, e.g., a center part of the filter is occupied by the fixing structure for screwing. This leads to a problem that an internal space of the air cleaner cannot be effectively ensured as a dust removal function.

The present disclosure has been made to solve the above-described problems, and is intended to, for example, easily attach/detach an air cleaner of an engine for a portable working machine without any tools, to prevent, in the case of using a connecting tool with a knob, application of great external force to a knob part in, for instance, engine dropping to reduce damage of the air cleaner, and to effectively ensure an internal space of the air cleaner to improve performance of the air cleaner.

In order to solve the above-described problems, the air cleaner of the engine for the portable working machine according to the present disclosure has the following configurations.

The air cleaner includes a frame member equipped at an intake port of a carburetor in the engine and provided with an air inlet port communicating with the intake port; a filter held by a holding part included in the frame member; a lid member configured to cover a front face of the filter; and a connecting tool with a knob, the connecting tool being configured to connect the frame member and the lid member together. The frame member is provided with an insertion hole, into which the connecting tool with the knob is inserted, on the outer side of the holding part. The lid member includes a part to be connected, to which the connecting tool with the knob is connected, the connecting tool being inserted into the insertion hole from a carburetor side. A knob part of the connecting tool with the knob is disposed on the inner side of a circumscribed line between the lid member and the engine.

The air cleaner, which has the above-described features, of the engine for the portable working machine can be easily attached/detached without any tools by operation of the knob part of the connecting tool with the knob. Since the knob part of the connecting tool with the knob is disposed on the inner side of the circumscribed line between the lid member and the engine, application of great external force to the knob part in, e.g., engine dropping can be prevented, and therefore, damage of the air cleaner can be reduced. Since the frame member and the lid member are connected together with the connecting tool with the knob on the outer side of the holding part of the frame member, the internal space of the air cleaner can be effectively ensured, and therefore, performance of the air cleaner can be improved.

DESCRIPTION OF THE PREFERRED EMBODIMENTS

Figure 1:
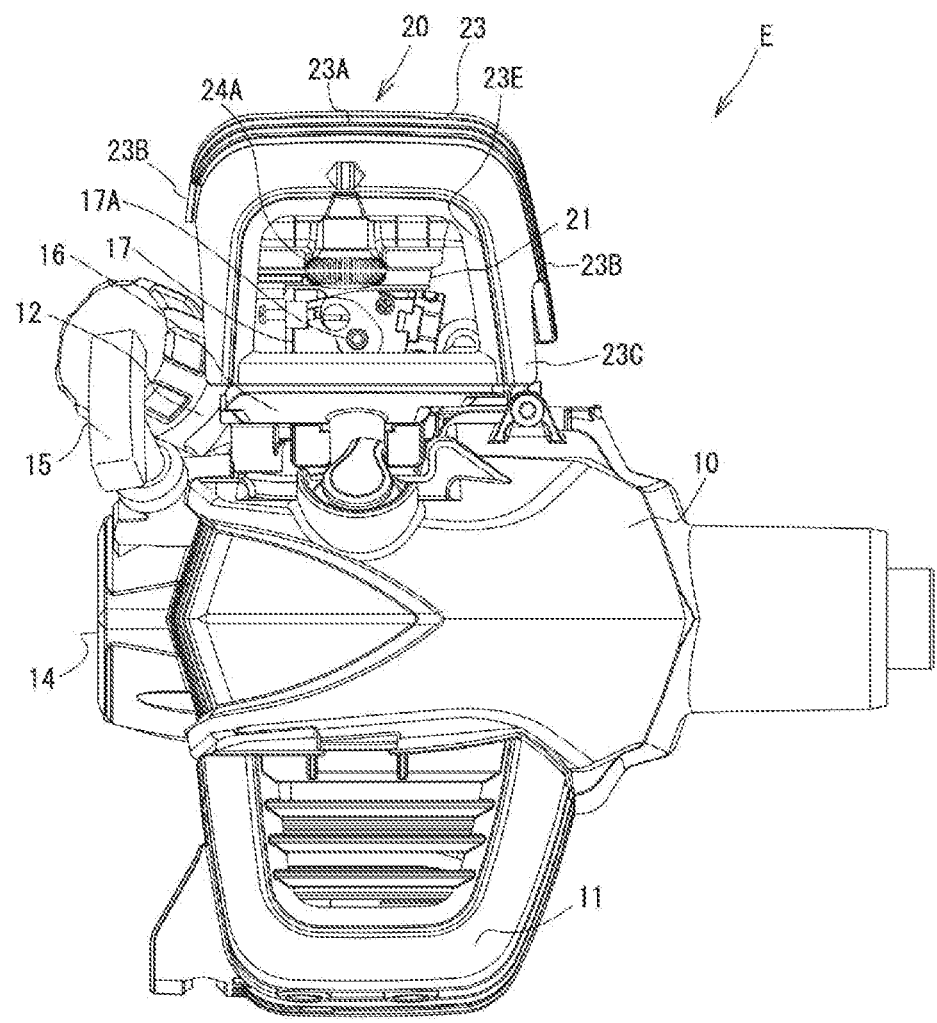
FIG. 1 is a plan view of an outer appearance of an engine for a portable working machine, the engine including an air cleaner of an embodiment of the present disclosure.
Figure 2:
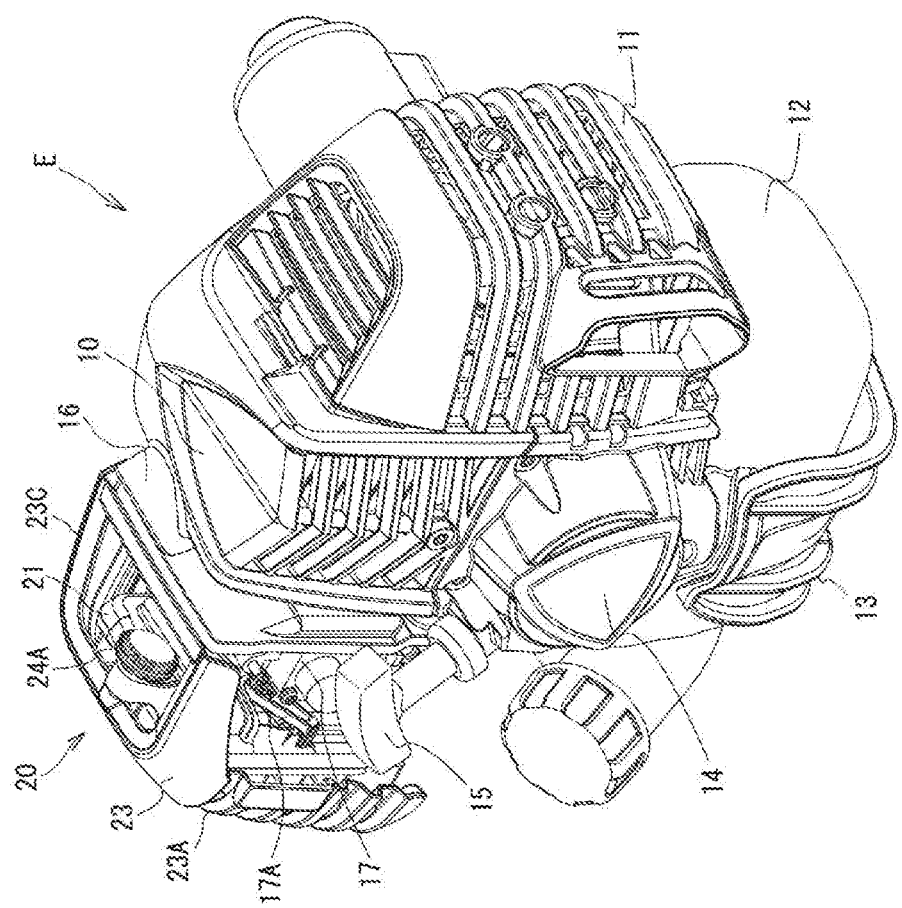
FIG. 2 is a perspective view of the outer appearance of the engine for the portable working machine, the engine including the air cleaner of the embodiment of the present disclosure.

An embodiment of the present disclosure will be described below with reference to drawings. FIGS. 1 and 2 illustrate an outer appearance of an engine E. The engine E is an engine for a portable working machine, and examples of the portable working machine include a brush cutter, a chain saw, a hedge trimmer, and a top handle type blower. The engine E includes, for example, an engine cover 10 configured to cover an engine body, a muffler cover 11 configured to cover a muffler, a tank accommodation frame 13 configured to accommodate a fuel tank 12, a recoil case 14, and a recoil grip 15.

The engine E is provided with a carburetor 17 through an insulator plate (a heat insulation plate) 16, and an air cleaner 20 is equipped on the outer side of an intake port of the carburetor 17.

Figure 3:
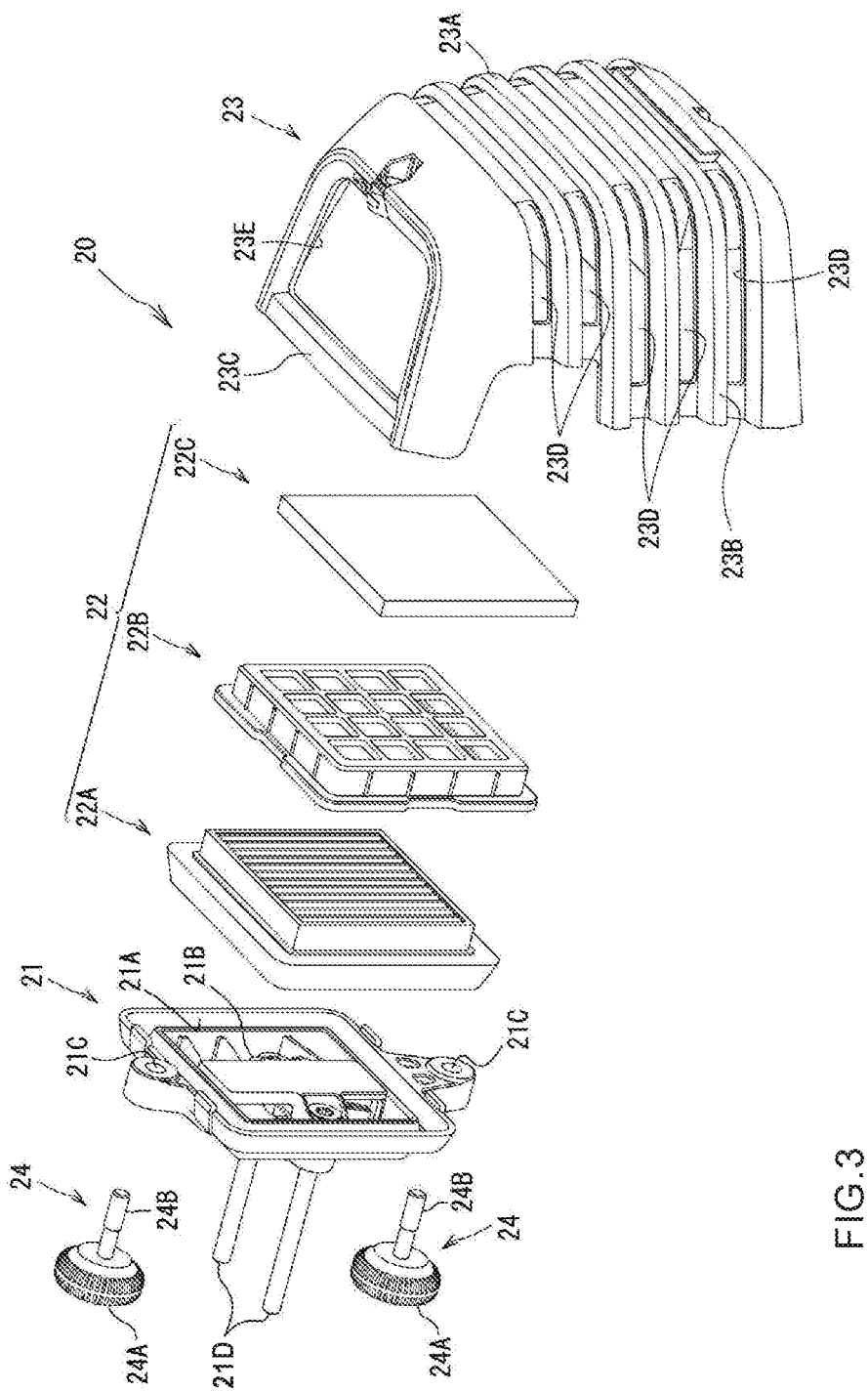
FIG. 3 is an exploded perspective view of the air cleaner of the embodiment of the present disclosure.

As illustrated in an exploded perspective view of FIG. 3, the air cleaner 20 includes a frame member 21 equipped at the intake port of the carburetor 17 at the engine E, a filter 22 held by a holding part 21A included in the frame member 21, a lid member (an air cleaner lid) 23 configured to cover a front face of the filter 22, and connecting tools with knobs. The case of using a screw 24 with a knob as an example of the connecting tool with the knob will be described below, but the connecting tool with the knob is not limited to the screw 24 with the knob. A knob part of the connecting tool with the knob includes a manually-operable handgrip, a lever (a handle), and a dial, for example.

The frame member 21 is configured such that a partition panel 21B is attached to the center of the holding part 21A and that an air inlet port communicating with the intake port of the carburetor 17 is provided on each side of the partition panel 21B. Moreover, insertion holes 21C into each of which a corresponding one of the screws 24 with the knobs is inserted are provided respectively on the upper and lower outer sides of the holding part 21A at the frame member 21. The frame member 21 is attached to the intake port of the carburetor 17 by a coupling tool 21D.

The filter 22 is detachably held by the holding part 21A of the frame member 21, and needs to be exchanged or cleaned before clogging is caused due to dust accumulation. The filter 22 is configured such that a main filter 22A, a sub-filter 22B, and a pre-filter 22C are disposed to overlap with each other.

The lid member 23 includes a front part 23A covering the front face of the filter 22, a side part 23B covering the side of the filter 22, and a cover part 23C extending above the carburetor 17. The side part 23B is provided with an air inlet hole 23D, and the cover part 23C is provided with a window 23E. In an illustrated example, a plurality of ribs 23F is provided to laterally extend on the inner side of the lid member 23 (see FIG. 4). The example where the cover part 23C extends above the carburetor 17 has been described herein, but the extension of the cover part 23C may be omitted not to form an outer frame of the window 23E.

The frame member 21 and the lid member 23 are connected together with the screws 24 with the knobs. In this state, the screws 24 with the knobs are, in a pair, disposed apart from each other in the vertical direction, and accordingly, the insertion holes 21C of the frame member 21 are, in a pair, provided respectively on the upper and lower outer sides of the holding part 21A. In the state in which each screw 24 with the knob is inserted into a corresponding one of the insertion holes 21C of the frame member 21 from the side close to the carburetor 17, such a screw 24 with the knob is screwed to a not-shown part (a fixing nut) to be connected, the part being provided at the lid member 23. In this manner, the lid member 23 is connected to the frame member 21, and the filter 22 is sandwiched between the frame member 21 and the lid member 23. Note that in the illustrated example, the screws 24 with the knobs are disposed respectively on the upper and lower sides of the frame member 21. However, the present disclosure is not limited to such an example, and the screws 24 with the knobs may be disposed respectively on the right and left sides of the frame member 21. Moreover, the screw 24 with the knob may be disposed only on one of the upper and lower sides (or the right and left sides) of the frame member 21, and the other side may be hinged, for instance.

A knob part 24A is provided on the base end side of each screw 24 with the knob, and a screw part 24B is provided on the tip end side of each screw 24 with the knob. Each knob part 24A is manually rotated such that each screw part 24B is screwed to the part (the fixing nut) to be connected at the lid member 23. Thus, the frame member 21 and the lid member 23 can be connected together without using any tools.

Figure 4:
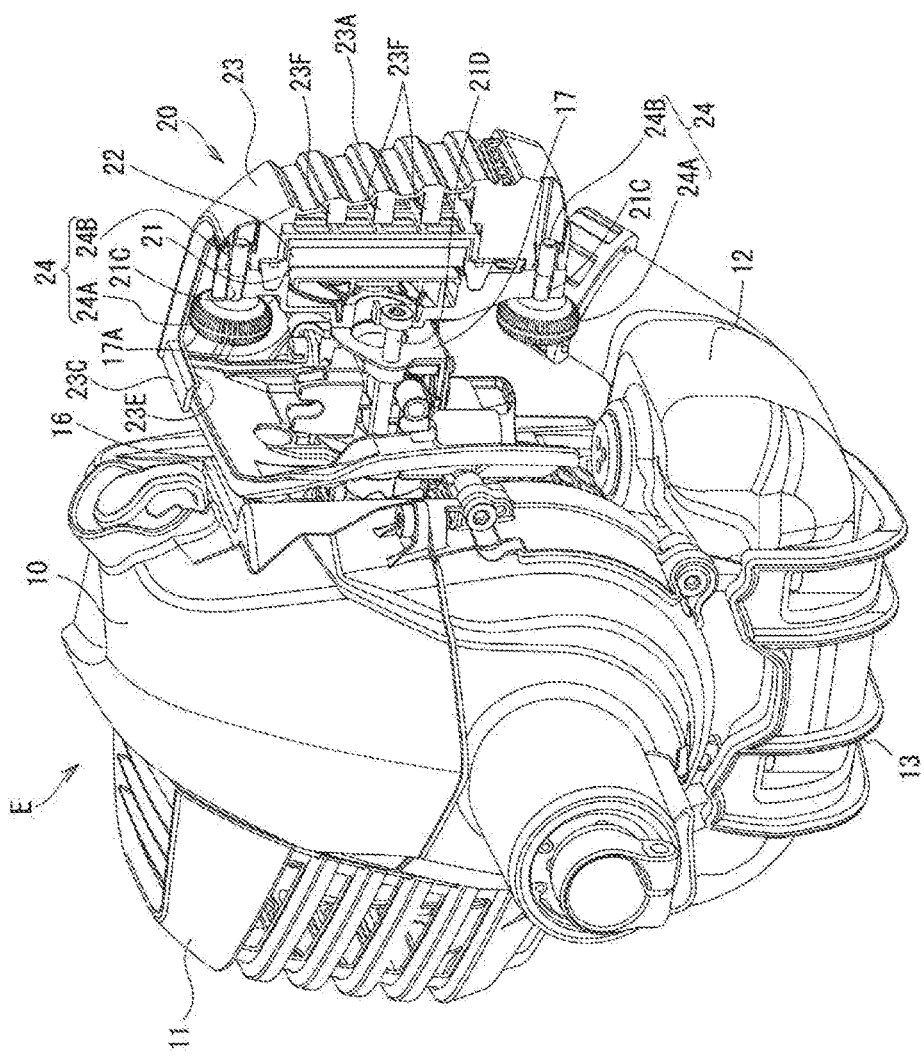
FIG. 4 is a partial cross-sectional view (perspective view) in the state in which the air cleaner of the embodiment of the present disclosure is equipped.
Figure 5:
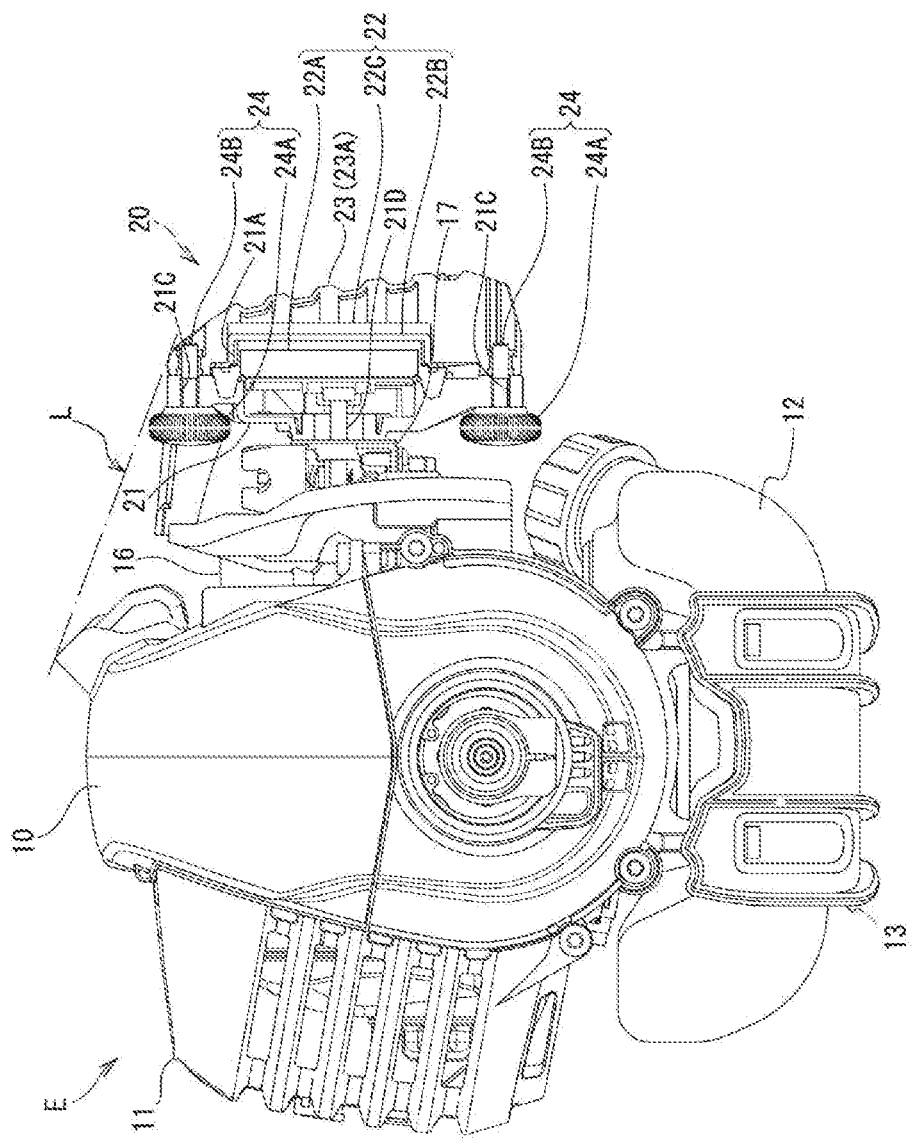
FIG. 5 is another partial cross-sectional view in the state in which the air cleaner of the embodiment of the present disclosure is equipped.

FIGS. 4 and 5 illustrate the state in which the air cleaner 20 is equipped. The knob parts 24A of the screws 24 with the knobs are disposed on the inner side of a circumscribed line between the lid member 23 and the engine E, the screws 24 connecting the frame member 21 and the lid member 23 together. Since the knob parts 24A are disposed on the inner side of the circumscribed line between the lid member 23 and the engine E, a structure is made such that less external force is directly applied to the knob parts 24A when the engine E turns over, for example.

In the illustrated example, the knob parts 24A are substantially accommodated in the window 23E provided at the cover part 23C of the lid member 23. Since the cover part 23C surrounds the knob parts 24A, a structure is made such that much less external force is directly applied to the knob parts 24A. Moreover, since the knob parts 24A are disposed to be substantially accommodated in (i.e., partially protrude from) the window 23E, rotary operation of the knob parts 24A is facilitated. Note that the knob parts 24A accommodated in the window 23E are disposed below a virtual line L (see FIG. 5) connecting between an upper end part of the lid member 23 and an upper end part of the engine E, and therefore, are disposed on the inner side of the circumscribed line between the lid member 23 and the engine E. With this structure, even if the knob parts 24A partially protrude from the window 23E, the structure is made such that less external force is directly applied to the knob parts 24A when the engine E turns over.

According to the above-described air cleaner 20, air having flowed into the lid member 23 through the air inlet hole 23D of the lid member 23 is sent to the filter 22, and then, the air having passed through the filter 22 is sent from the air inlet port of the frame member 21 to the intake port of the carburetor 17. In this state, since no structure for connecting the frame member 21 and the lid member 23 is provided on the inner side of the holding part 21A of the frame member 21 and the filter 22, e.g., the effective area of the filter 22 is ensured, and clean air can be sent to the intake port of the carburetor 17. Thus, the air cleaner 20 can be provided with high dust removal performance.

In replacement of the filter 22 of the air cleaner 20, the lid member 23 can be, without any tools, separated from the frame member 21 by manual rotation of the knob part 24A of the upper screw 24 with the knob and manual rotation of the knob part 24A of the lower screw 24 with the knob. At this point, both of the upper and lower knob parts 24A partially protrude from the lid member 23, and therefore, manual rotary operation is facilitated. Since the upper knob part 24A is surrounded by the cover part 23C of the lid member 23, failure accompanied by damage of the connection structure of the air cleaner 20 due to direct external force application to the knob parts 24A is reduced even when the engine E turns over, for example.

In the illustrated example, the cover part 23C of the lid member 23 extends above the carburetor 17, and an adjusting part 17A of the carburetor 17 is disposed at such a position that the adjusting part 17A is visible through the window 23E. According to such a structure, the structure for protecting the knob parts 24A by the cover part 23C can be employed while the carburetor 17 can be easily adjusted through the window 23E of the cover part 23C.

The engine E including the air cleaner 20 with the above-described features exhibits favorable maintainability for easy replacement of the filter 22 of the air cleaner 20, as well as providing stable output by high dust removal performance of the air cleaner 20. Moreover, the risk of damaging the air cleaner 20 and the knob parts 24A thereof can be reduced. The portable working machine, such as the brush cutter, provided with the above-described engine E can exhibit favorable maintainability, can be indestructible, and can provide stable operation performance.

The embodiment of the present disclosure has been described above in detail with reference to the drawings. However, the specific configuration is not limited to that of the above-described embodiment. Even if design change etc. are made without departing from the gist of the present disclosure, such design change etc. are included in the present disclosure.

REFERENCE SIGNS LIST

10: engine cover, 11: muffler cover, 12: fuel tank, 13: tank accommodation frame, 14: recoil case, 15: recoil grip, 16: insulator plate (heat insulation plate), 17: carburetor, 17A: adjusting part, 20: air cleaner, 21: frame member, 21A: holding part, 21B: partition panel, 21C: insertion hole, 21D: coupling tool, 22: filter, 22A: main filter, 22B: sub-filter, 22C: pre-filter, 23: lid member (air cleaner lid), 23A: front part, 23B: side part, 23C: cover part, 23D: air inlet hole, 23E: window, 23F: rib, 24: screw with knob (connecting tool with knob), 24A: knob part, 24B: screw part, E: engine

What is claimed is:

1. An air cleaner of an engine for a portable working machine, comprising:
a frame member equipped at an intake port of a carburetor in the engine and provided with an air inlet port communicating with the intake port;
a filter held by a holding part included in the frame member;
a lid member configured to cover a front face of the filter; and
a connecting tool with a knob, the connecting tool being configured to connect the frame member and the lid member together,
wherein the frame member is provided with an insertion hole, into which the connecting tool with the knob is inserted, on an outer side of the holding part,
wherein the lid member includes a part to be connected, to which the connecting tool with the knob is connected, the connecting tool being inserted into the insertion hole from a carburetor side, and
a knob part of the connecting tool with the knob is disposed on an inner side of a circumscribed line between the lid member and the engine.

2. The air cleaner according to claim 1, wherein the knob part of the connecting tool with the knob is disposed below a virtual line connecting between an upper end part of the lid member and an upper end part of the engine.

3. The air cleaner according to claim 1, wherein the lid member includes a cover part provided with a window extending above the carburetor and accommodating the knob part of the connecting tool with the knob.

4. The air cleaner according to claim 3, wherein an adjusting part of the carburetor is disposed at a position from which the adjusting part is visible through the window.

5. An engine comprising:
the air cleaner according to claim 1.

6. A portable working machine comprising:
the engine according to claim 5.

* * * * *